C. LINDSTRÖM.
CLUTCH ACTUATING DEVICE FOR PHONOGRAPHS.
APPLICATION FILED JUNE 10, 1910.
1,034,126.
Patented July 30, 1912.
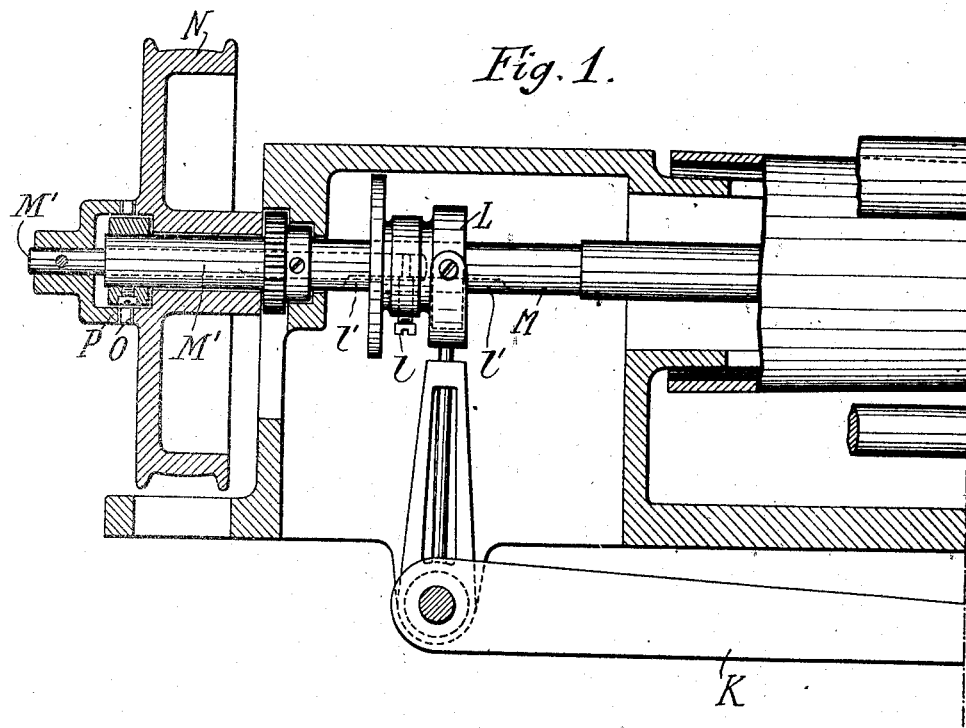
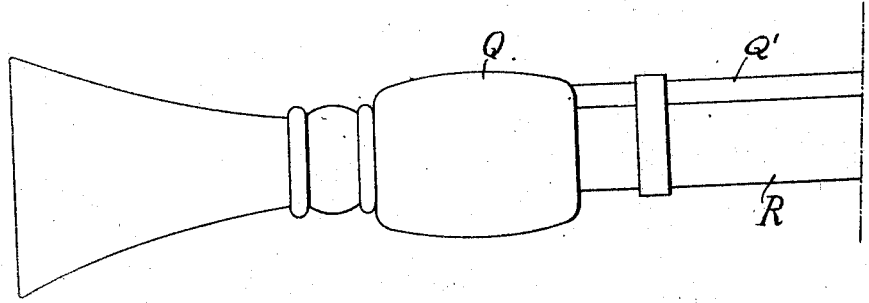

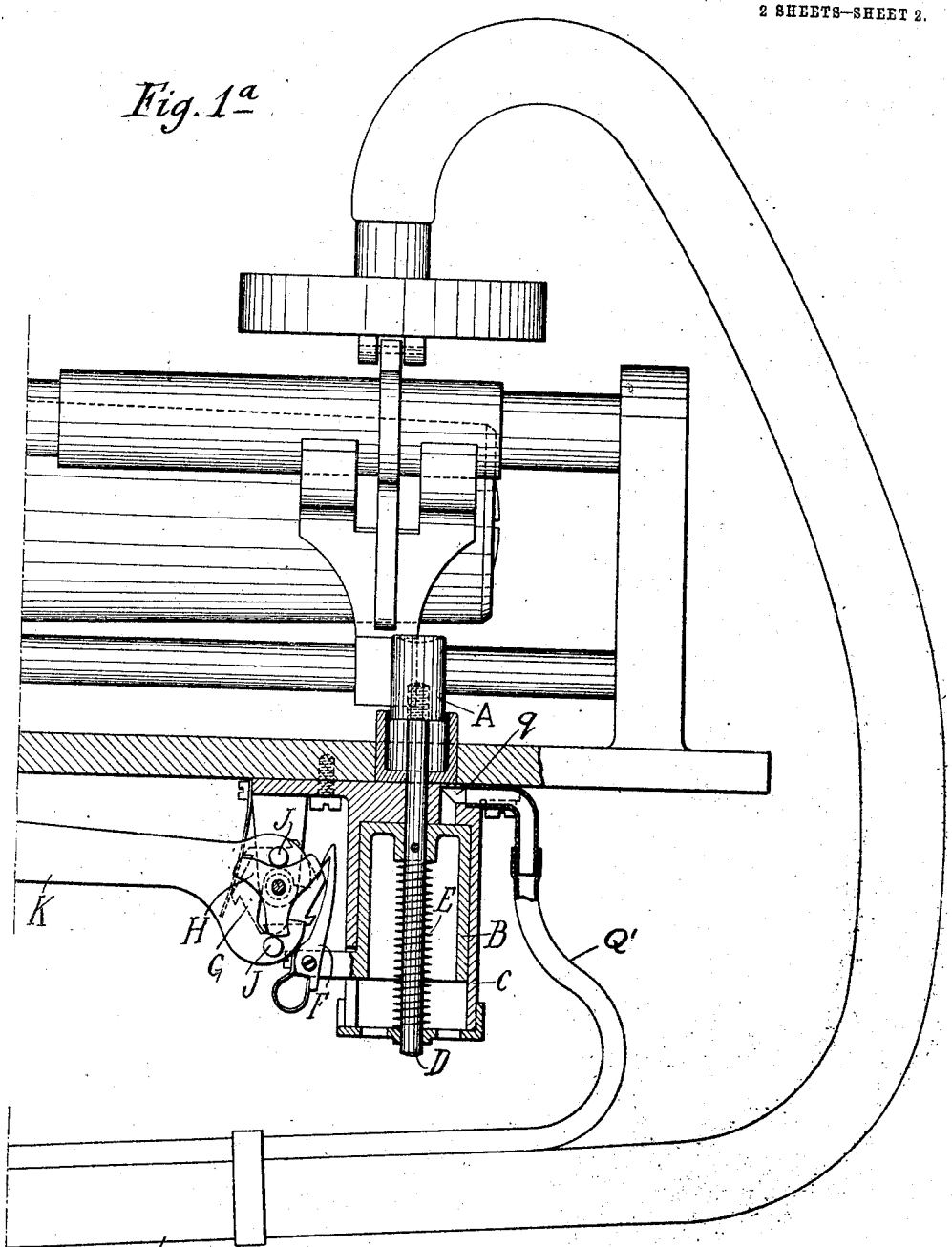

UNITED STATES PATENT OFFICE.

CARL LINDSTRÖM, OF BERLIN, GERMANY.

CLUTCH-ACTUATING DEVICE FOR PHONOGRAPHS.

1,034,126.  Specification of Letters Patent.  Patented July 30, 1912.

Application filed June 10, 1910. Serial No. 566,213.

*To all whom it may concern:*

Be it known that I, CARL LINDSTRÖM, a subject of the King of Sweden, and a resident of 137 Grosse Frankfurterstrasse, Berlin, Germany, have invented a certain new and useful Improvement in or Relating to Clutch-Actuating Devices for Phonographs; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

In phonographs, and especially in machines for dictating, it is of importance to be able to place the cylinder out of operation at any desired moment in a convenient manner.

This invention has for its object to provide means for this purpose.

In the accompanying drawing, Figures 1 and 1$^a$ show one form of my improved clutch-actuating device for phonographs, parts being in section and parts in side-view.

As shown, A is a knob for pressing down a sleeve B contained in a cylinder C by means of a stem D on which the sleeve B is fixed. A spiral spring E encircles the stem D between the inner end of the sleeve B and the lower end of the cylinder C. This spring E has a tendency to return the sleeve B into its normal position shown in the drawing. A pawl F connected to the sleeve B, is adapted to engage and rotate a toothed wheel G when the sleeve B is depressed by pressing the knob A.

H is a cam disk mounted on the same axle as the toothed wheel G; it is adapted to engage studs J carried in one end of an elbow-lever K. The resulting motion of the elbow-lever K is transmitted by means of a disk L to the shaft M of the phonograph cylinder.

N is a belt pulley running loose on the shaft M; it is provided on one side with a claw clutch-face O. P is the claw clutch face coöperating therewith, fixed on an extension rod M$^1$.

The collar L is applied by a set-screw $l$ extending through a slot $l'$ into the shaft M so as to be placed into clamping engagement with the inner end of the extension-rod M$^1$. The movable clutch-member P is keyed to the shaft M$^1$ and disengaged from the clutch-member O on the loose pulley N when the collar L is moved toward the left. So long as the parts are in the positions shown in the drawing, that is, so long as the sleeve B is in its upper position, the studded end of the elbow-lever K is depressed and the disk L is in its right hand position in which the clutch members P and O are in engagement, so that the shaft M can now be driven positively by the belt pulley N. If now however by pressing the knob A, the sleeve B is depressed, so as to operate the pawl F, wheel G, cam disk H and studs J, to tilt the elbow-lever K so as to move the disk L and through it the shaft M for a short distance toward the left, the clutch-member P will be moved out of engagement with the clutch member O, and the belt pulley N will now run loose again on the shaft M, which being no longer driven, comes to a standstill and thus stops the motion of the phonograph cylinder. The elbow-lever K may be actuated also by operating the sleeve B by pneumatic means.

In some cases for the sake of convenience, which is especially important in machines for dictating, the pneumatic operation of the sleeve B may be effected through a flexible pipe Q$^1$ by means of an air bulb Q arranged on the speaking tube of the machine, whereby the person dictating, is enabled to stop the phonograph cylinder at once with the greatest ease. The flexible pipe Q communicates with a channel $q$ in the upper end of the cylinder C, said channel opening to the upper closed end of the sleeve B.

What I claim is:

1. In a clutch-actuating device for phonographs, the combination with the record-shaft, of driving-means, a clutch between the record-shaft and driving-means, a controlling-device, and means for moving said clutch alternately in and out of clutching position on successive impulses in the same direction of the controlling-device.

2. In a clutch-actuating device for phonographs, the combination with the record-shaft, of driving-means, a clutch between the record-shaft and driving-means, a controlling-device adapted to be actuated by fluid-pressure, and means for moving said clutch alternately in and out of clutching position on successive impulses in the same direction of the controlling-device.

3. In a clutch-actuating device for phonographs, the combination with the record-shaft, of driving-means, a clutch between the record-shaft and driving-means, a controlling-device, a pressure bulb connected with the controlling-device, and means for moving said clutch alternately in and out of clutching position on successive impulses in the same direction of said controlling-device.

4. In a clutch-actuating device for phonographs, the combination with the record-shaft, of driving-means, a clutch between the record-shaft and driving-means, a controlling-device, a lever-arm engaging the record-shaft, a cam-wheel actuated by said controlling device, studs on said lever-arm for said cam-wheel, and means operable by the controlling-device for moving said cam, said cam and means being adapted to move said arm alternately in opposite directions on successive impulses in the same direction of said controlling-device.

In testimony whereof I affix my signature in presence of two witnesses.

CARL LINDSTRÖM.

Witnesses:
 HENRY HASPER,
 WOLDEMAR HAUPT.